(12) United States Patent
Duan et al.

(10) Patent No.: US 10,115,180 B2
(45) Date of Patent: Oct. 30, 2018

(54) IMAGE INTERPOLATION DEVICE AND METHOD THEREOF

(71) Applicant: BOE TECHNOLOGY GROUP CO., LTD., Beijing (CN)

(72) Inventors: Ran Duan, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 15/030,588

(22) PCT Filed: Dec. 10, 2015

(86) PCT No.: PCT/CN2015/096933
§ 371 (c)(1),
(2) Date: Apr. 19, 2016

(87) PCT Pub. No.: WO2016/197571
PCT Pub. Date: Dec. 15, 2016

(65) Prior Publication Data
US 2016/0364839 A1    Dec. 15, 2016

(30) Foreign Application Priority Data
Jun. 10, 2015    (CN) .......................... 2015 1 0317022

(51) Int. Cl.
*G06T 3/40* (2006.01)
*G06K 9/00* (2006.01)
(Continued)

(52) U.S. Cl.
CPC .......... *G06T 3/403* (2013.01); *G06K 9/00536* (2013.01); *G06K 9/4604* (2013.01);
(Continued)

(58) Field of Classification Search
None
See application file for complete search history.

(56) References Cited

U.S. PATENT DOCUMENTS 7,664,316 B2 *  2/2010  Aoki .................. H04N 9/045
                                                348/222.1
2003/0206667 A1  11/2003  Wang et al.
(Continued)

FOREIGN PATENT DOCUMENTS

CN    103500435 A    1/2014
CN    104077773 A    10/2014
(Continued)

OTHER PUBLICATIONS

International Search Report & Written Opinion dated Feb. 29, 2016 regarding PCT/CN2015/096933.
(Continued)

*Primary Examiner* — Kim Vu
*Assistant Examiner* — Nathan Bloom
(74) *Attorney, Agent, or Firm* — Intellectual Valley Law, P.C.

(57) ABSTRACT

The present application discloses an image interpolation method for interpolating a pixel and enhancing an edge in an image, comprising detecting an edge position in an image; obtaining edge characteristics associated with the edge position; determining whether an interpolation point is located within an edge region based on the edge characteristics of an array of p×q pixels surrounding the interpolation point, wherein p and q are integers larger than 1; determining edge direction of an interpolation point located within the edge region, wherein the edge direction is normal to gradient direction; classifying the edge direction accordingly to in angle subclasses and n angle classes; wherein each angle class comprises one or more subclasses, m and n are integers, and n≤m; selecting a one-dimensional horizontal (Continued)

interpolation kernel based on the angle class; performing a horizontal interpolation using the selected one-dimensional horizontal interpolation kernel; and performing a vertical interpolation using a one-dimensional vertical interpolation kernel.

20 Claims, 5 Drawing Sheets

(51) Int. Cl.
*G06K 9/46* (2006.01)
*G06T 7/13* (2017.01)

(52) U.S. Cl.
CPC .............. *G06T 3/4007* (2013.01); *G06T 7/13* (2017.01); *G06T 2207/10004* (2013.01); *G06T 2207/20012* (2013.01); *G06T 2207/20192* (2013.01)

(56) References Cited

U.S. PATENT DOCUMENTS

| | | | |
|---|---|---|---|
| 2007/0091188 A1* | 4/2007 | Chen | G06T 3/4015 348/273 |
| 2008/0075393 A1* | 3/2008 | Kwon | G06T 3/4015 382/300 |
| 2014/0010478 A1* | 1/2014 | Ndiour | G06T 3/4007 382/300 |
| 2014/0075004 A1* | 3/2014 | Van Dusen | H04L 41/04 709/223 |
| 2015/0288851 A1 | 10/2015 | Takashima et al. | |
| 2015/0363910 A1* | 12/2015 | Sun | G06T 3/403 382/300 |
| 2016/0267675 A1 | 9/2016 | Du et al. | |

FOREIGN PATENT DOCUMENTS

| | | |
|---|---|---|
| CN | 104200426 A | 12/2014 |
| CN | 104881843 A | 9/2015 |
| JP | 2014085892 A | 5/2014 |

OTHER PUBLICATIONS

First Office Action in the Chinese Patent Application No. 201510317022.5, dated Jul. 24, 2017; English translation attached.

Second Office Action in the Chinese Patent Application No. 201510317022.5, dated Dec. 11, 2017; English translation attached.

* cited by examiner

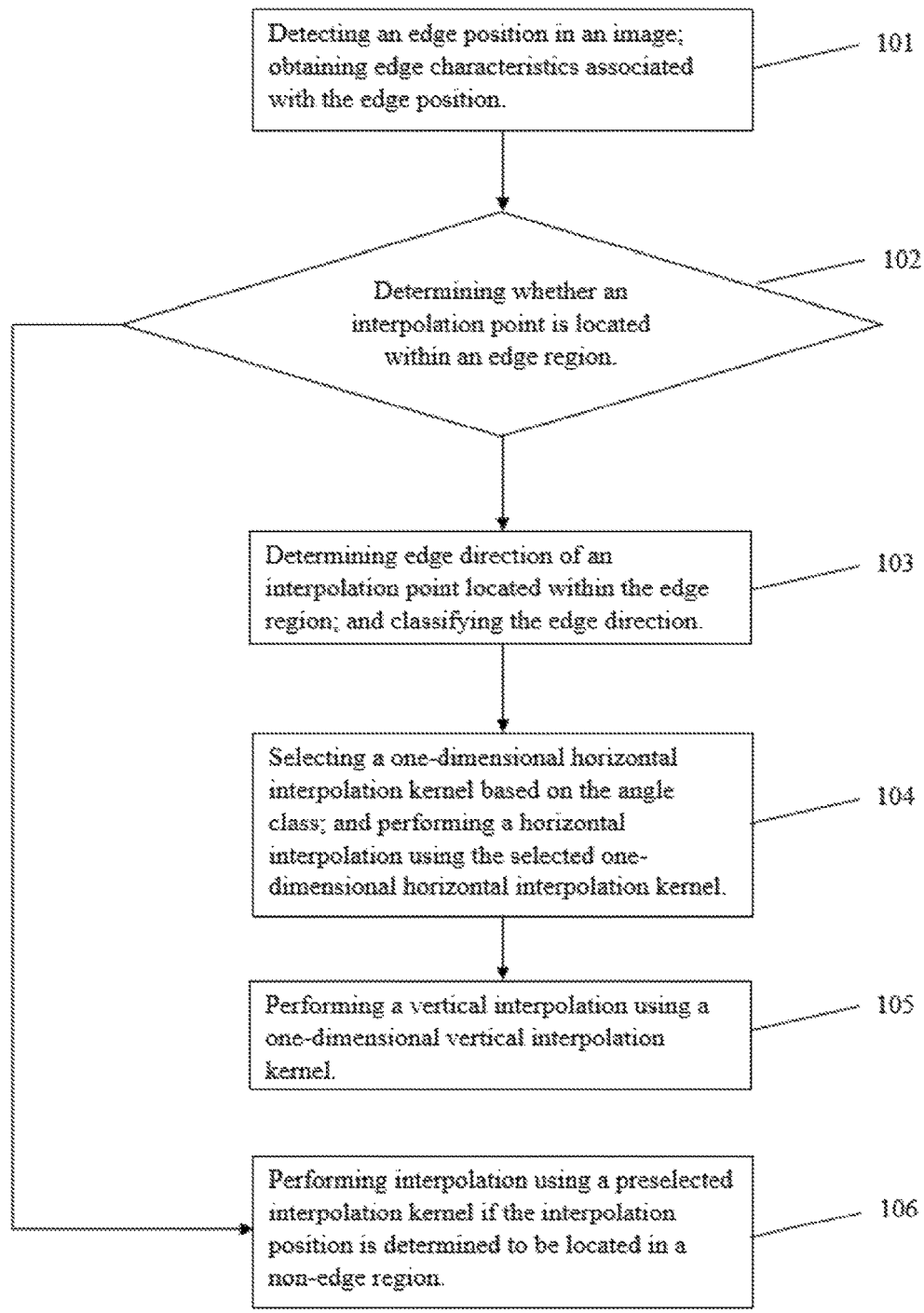

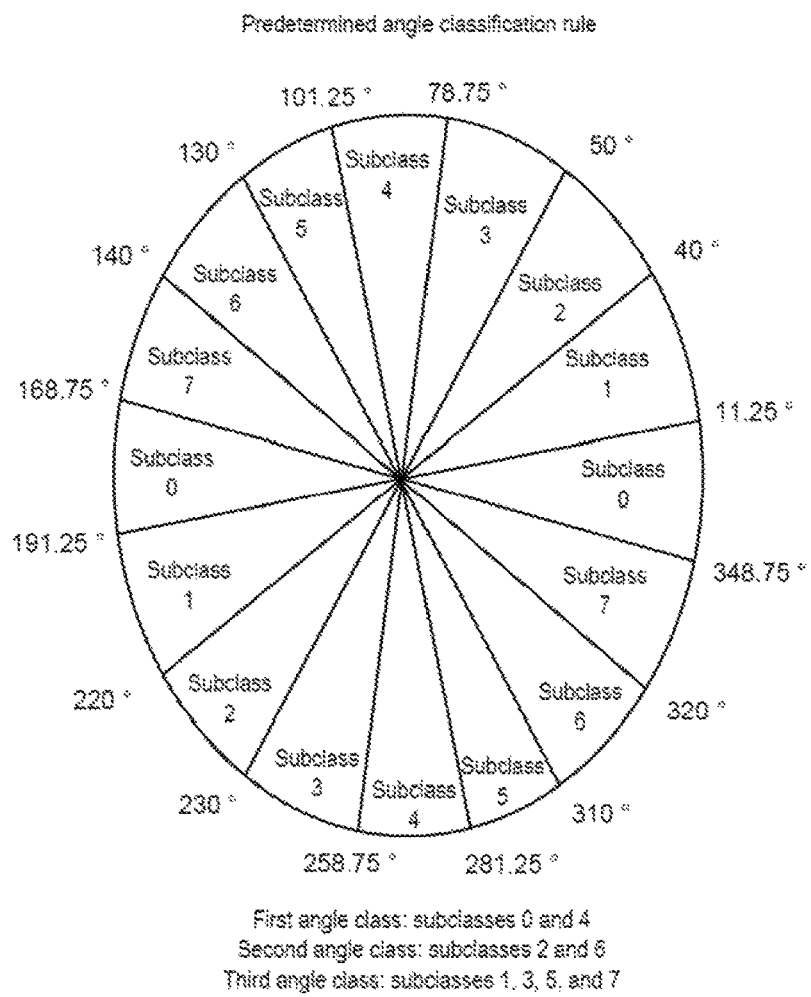
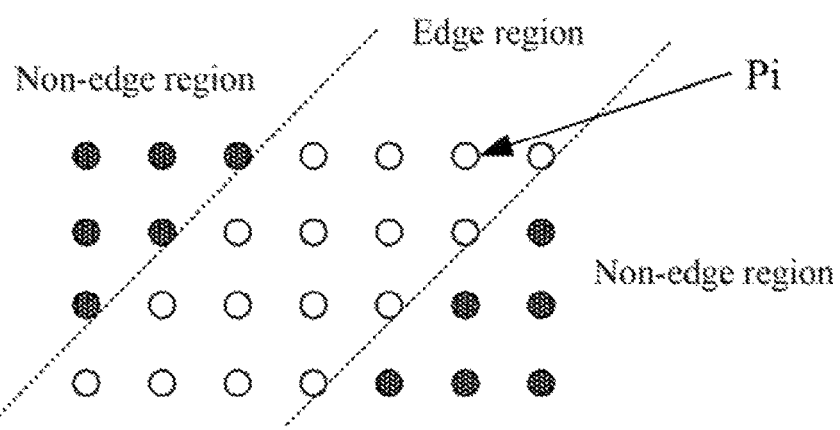

IMAGE INTERPOLATION DEVICE AND METHOD THEREOF

CROSS-REFERENCE TO RELATED APPLICATION

This application is a national stage application under 35 U.S.C. § 371 of International Application No. PCT/CN2015/096933 filed Dec. 10, 2015, which claims priority to Chinese Patent Application No. 201510317022.5, filed Jun. 10, 2015, the contents of which are incorporated by reference in the entirety.

FIELD

The present invention related to display technology, particularly an image interpolation device and method thereof.

BACKGROUND

Conventional image interpolation technology typically utilizes a two-dimensional interpolation kernel such as a Nearest interpolation kernel, a Bilinear interpolation kernel, a Bicubic interpolation kernel, a Lanczos interpolation kernel (Lanczos 1, Lanczos 2, Lanczos 4, or Lanczos 6). Interpolation using a kernel having a smaller kernel size often results in an image having distortion and abasing defects. Interpolation using a kernel having a large kernel size places an exceptional demand on computational resources.

SUMMARY

The present invention provides an image interpolation method for interpolating, a pixel, comprising detecting an edge position in an image and obtaining edge characteristics associated with the edge position; determining whether an interpolation point is located within an edge region based on the edge characteristics of an array of p×q pixels surrounding the interpolation point, wherein p and q are integers larger than 1; determining edge direction of an interpolation point located within the edge region; classifying the edge direction into one of m angle subclasses and one of n angle classes; wherein each angle class comprises one or more subclasses, m and n are integers, and n≤m; selecting a one-dimensional horizontal interpolation kernel based on the classified angle class, performing a horizontal interpolation on the interpolation point using the selected one-dimensional horizontal interpolation kernel and performing a vertical interpolation, on the interpolation point using a predetermined one-dimensional vertical interpolation kernel.

Optionally, the step of detecting the edge position in the image and obtaining the edge characteristics associated with the edge position comprises computing a gradient amplitude and as gradient direction in each pixel; and comparing the gradient amplitude in each pixel with a first threshold value, wherein the pixel is classified as the edge position when the gradient amplitude in the pixel is larger than or equals to the first threshold value. Optionally, the step of determining whether the interpolation point is within the edge region comprises tallying, the edge positions within an array of p×q pixels surrounding the interpolation point; calculating the number of edge positions in each of the m angle subclasses within the array; and determining whether the interpolation position is located within the edge region; wherein the interpolation position is determined to be located within the edge region if the number of edge positions within any one of the m angle subclasses is larger than or equals to a second threshold value, otherwise the interpolation position is determined to be located in a non-edge region. Optionally, the step of classifying the edge direction comprises selecting the angle subclass having the maximum numbers of edge positions within the array of p×q pixels as a closest angle subclass; assigning the closest angle subclass to one of the n angle classes according to a predetermined angle class classification rule; and using the assigned angle class as the angle class for the edge direction. Optionally, the step of performing the vertical interpolation on the interpolation point comprises using a one-dimensional Lanczos3 vertical interpolation kernel for performing the vertical interpolation on the interpolation point. Optionally, the method further comprises performing interpolation on the interpolation point using a preselected interpolation kernel if the interpolation position is determined to be located in a non-edge region. Optionally, p=q, n=3, the n angle classes comprises a first angle class, a second angle class, and as third angle class, and the method further comprises performing the horizontal interpolation using a one-dimensional Lanczos6 horizontal interpolation kernel on the interpolation point having the edge direction in the first angle class; performing the horizontal interpolation using a one-dimensional Bicubic horizontal interpolation kernel on the interpolation point having the edge direction in the second angle class; or performing, the horizontal interpolation using as one-dimensional Lanczos3 horizontal interpolation kernel on the interpolation point having the edge direction in the third angle class. Optionally, m=8, and the edge direction is classified according to one of the following two predetermined subclass classification rules:

subclass 0: [0°, 11.25°+α]∪[168.75°, 191.25°+α]∪[348.75°, 360°];
subclass 1: [11.25°, 40°+α]∪[191.25°, 220°+α];
subclass 2: [40°, 50°+α]∪[220°, 230°+α];
subclass 3: [50°, 78.75+α]∪[230°, 258.75°+α];
subclass 4: [78.75°, 101.25°+α]∪[258.75°, 281.25°+α];
subclass 5: [101.25°, 130°+α]∪[281.25°, 310°+α];
subclass 6: [130°, 140°+α]∪[310°, 320°+α];
subclass 7: [140°, 168.75°+α]∪[320°, 348.75°+α]; or
subclass 0: [0°, 11.25°]∪[168.75°−α, 191.25°]∪[348.75°−α, 360°];
subclass 1: [11.25°−α, 40°]∪[191.25°−α, 220°];
subclass 2: [40°−α, 50°]∪[220°−α, 230°];
subclass 3: [50°−α, 78.75]∪[230°−α, 258.75°];
subclass 4: [78.75°−α, 101.25°]∪[258.75°−α, 281.25°];
subclass 5: [101.25°−α, 130°]∪[281.25°−α, 310°];
subclass 6: [130°−α, 140°]∪[310°−α, 320°];
subclass 7: [140°−α, 168.75°]∪[320°−α, 348.75°];
wherein α is between 0° and 5°, the first angle class comprises the subclasses 0 and 4, the second angle class comprises the subclasses 2 and 6, the third angle class comprises the subclasses 1, 3, 5, and 7, and the edge direction is measured in a counterclockwise direction from right horizontal direction. Optionally, p=q. Optionally, the second threshold value is 10.

The present invention also provides an image interpolation device for interpolating a pixel and enhancing an edge in an image, comprising an edge detection module for detecting an edge position in an image and obtaining edge characteristics associated with the edge position: an edge region determination module for determining whether an interpolation point is located within an edge region based on the edge characteristics of an array of p×q pixels surrounding the interpolation point, wherein p and q are integers larger than 1; an edge direction classification module for determining edge direction of an interpolation point located within the edge region; and classifying the edge direction into one of m angle subclasses and one of n angle classes; wherein each angle class comprises one or more subclasses, in and n are integers, and n≤m; a horizontal interpolation module for selecting a one-dimensional horizontal interpolation kernel based on the classified angle class, and performing a horizontal interpolation on the interpolation point using the selected one-dimensional horizontal interpolation kernel; and a vertical interpolation module for performing a vertical interpolation on the interpolation point using a one-dimensional vertical interpolation kernel.

Optionally, the edge detection module comprises a gradient computation unit for computing a gradient amplitude and a gradient direction in each pixel, and a gradient comparison unit for comparing the gradient in each pixel with a first threshold value; wherein the pixel is classified as the edge position when the gradient amplitude in the pixel is larger than or equals to the first threshold value. Optionally, the edge region determination module comprises an edge position tallying unit for tallying the edge positions within an array of p×q pixels surrounding the interpolation point, and calculating the number of edge positions in each of the m angle subclasses within the array, and an edge region determination unit for determining whether the interpolation position is located in the edge region; wherein the interpolation position is determined to be located within the edge region if the number of edge positions within any one of the m angle subclasses is larger than or equals to a second threshold value, otherwise the interpolation position is determined to be located in a non-edge region. Optionally, the edge direction classification module comprises a closest angle subclass selection unit for selecting the angle subclass having the maximum numbers of edge positions within the array of p×q pixels as a closest angle subclass; and an angle class assignment unit for assigning the closest angle subclass to one of the n angle classes according to a predetermined angle class classification rule, and using, the assigned angle class as the angle class for the edge direction. Optionally, the vertical interpolation module uses a one-dimensional Lanczos3 vertical interpolation kernel for performing the vertical interpolation on the interpolation point. Optionally, the device further comprises a non-edge region interpolation module for performing interpolation using a preselected interpolation kernel if the interpolation position is determined to be located in a non-edge region. Optionally, p=q, n=3, the n angle classes comprises a first angle class, a second angle class, and a third angle class, and the horizontal interpolation module comprises a first horizontal interpolation unit for performing the horizontal interpolation using a one-dimensional Lanczos6 horizontal interpolation kernel on the interpolation point having the edge direction in the first angle class; a second horizontal interpolation unit for performing the horizontal interpolation using a one-dimensional Bicubic horizontal interpolation kernel on the interpolation point having the edge direction in the second angle class; a third horizontal interpolation unit for performing the horizontal interpolation using a one-dimensional Lanczos3 horizontal interpolation kernel on the interpolation point having the edge direction in the third angle class. Optionally, m=8, and the edge direction is classified according to one of the following two predetermined subclass classification rules:

subclass 0: [0°, 11.25°+α]∪[168.75°, 191.25°+α]∪[348.75°, 360°];
subclass 1: [11.25°, 40°+α]∪[191.25°, 220°+α];
subclass 2: [40°, 50°+α]∪[220°, 230°+α];
subclass 3: [50°, 78.75+α]∪[230°, 258.75°+α];
subclass 4: [78.75°, 101.25°+α]∪[258.75°, 281.25°+α];
subclass 5: [101.25°, 130°+α]∪[281.25°, 310°+α];
subclass 6: [130°, 140°+α]∪[310°, 320°+α];
subclass 7: [140°, 168.75°+α]∪[320°, 348.75°+α]; or
subclass 0: [0°, 11.25°]∪[168.75°−α, 191.25°]∪[348.75°−α, 360°];
subclass 1: [11.25°−α, 40°]∪[191.25°−α, 220°];
subclass 2: [40°−α, 50°]∪[220°−α, 230°];
subclass 3: [50°−α, 78.75]∪[230°−α, 258.75°];
subclass 4: [78.75°−α, 101.25°]∪[258.75°−α, 281.25°];
subclass 5: [101.25°−α, 130°]∪[281.25°−α, 310°];
subclass 6: [130°−α, 140°]∪[310°−α, 320°];
subclass 7: [140°−α, 168.75°]∪[320°−α, 348.75°];

wherein α is between 0° and 5°, the first angle class comprises the subclasses 0 and 4, the second angle class comprises the subclasses 2 and 6, the third angle class comprises the subclasses 1, 3, 5, and 7, and the edge direction is measured in a counterclockwise direction from right horizontal direction. Optionally, p=q. Optionally, the second threshold value is 10.

The present invention further provides a computer-readable storage medium configured to execute the method described herein.

BRIEF DESCRIPTION OF THE FIGURES

The following drawings are merely examples for illustrative purposes according to various disclosed embodiments and are not intended to limit the scope of the present invention.

FIG. 1 is a flow chart illustrating an image interpolation method according to one embodiment.

FIG. 3 is a diagram showing an unprocessed original image according to one embodiment.

DETAILED DESCRIPTION OF THE EMBODIMENTS

Figure 2A:
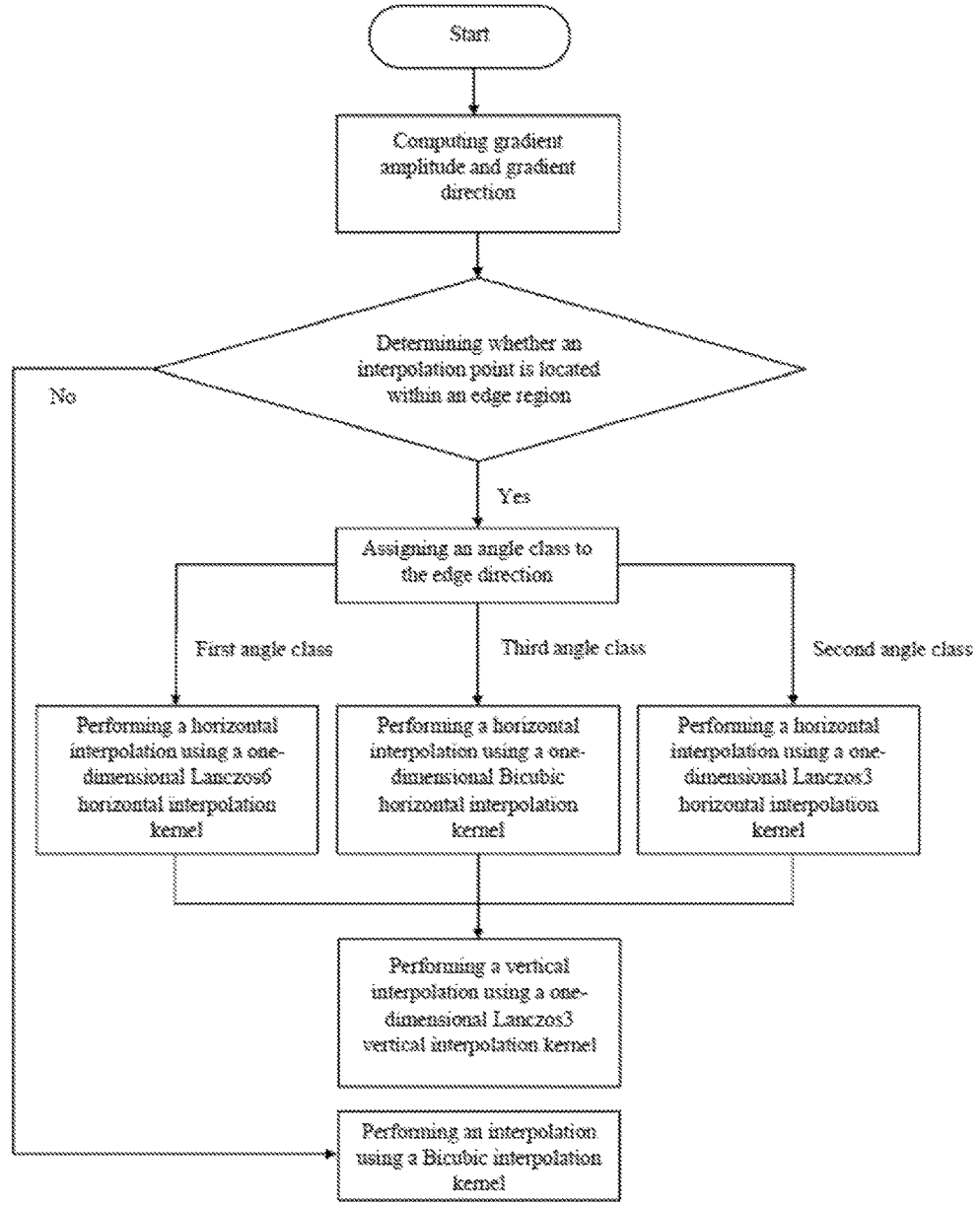
FIG. 2 is a flow chart illustrating an image interpolation method according to another embodiment.

The disclosure will now describe more specifically with reference to the following embodiments. It is to be noted that the following descriptions of preferred embodiments are presented herein for purpose of illustration and description only, it is not intended to be exhaustive or to be limited to the precise form disclosed.

FIG. 1 is a flow chart illustrating an image interpolation method for interpolating a pixel and enhancing an edge in an image according to one embodiment. Referring to FIG. 1, the image interpolation method in the embodiment includes a step 101, i.e., detecting an edge position in an image and obtaining one or more edge characteristics associated with the edge position. Typically, detecting the edge position includes one or more of a smoothing process, a sharpening process, a thresholding process, and a localization process. In the smoothing process, as much noise as possible is suppressed without destroying true, edges, e.g., using a Gaussian kernel of a user specified width. In the sharpening process, the quality of edges is enhanced by differentiation. The thresholding process is applied to determine which edge pixels should be discarded as noise and which should be retained. The exact edge location is determined by a localization process.

Edge characteristics associated with the edge position include, but are not limited to, edge direction, edge strength, edge position, gradient amplitude and gradient direction. The gradient direction is normal to the edge direction. For example, in the step 101, once an edge position is determined, gradient amplitude and gradient direction associated with the edge position can be calculated.

Various operators can be used for calculating gradient amplitude and gradient direction. Examples of operators useful for calculating gradient amplitude and gradient direction include, but are not limited to, a Sobel operator, a Canny operator, a Laplacian operator, and a Roberts operator. For example, the gradient amplitude and gradient direction can be calculated using a Sobel operator. In an exemplary process, the Sobel operator is converted into as horizontal one-dimensional filter coefficient and a vertical one-dimensional filter coefficient. The horizontal one-dimensional filter coefficient is $Sob_x=[-1\ 0\ 1]$, and the vertical one-dimensional filter coefficient is $Sob_y=[-1\ 0\ 1]^T$.

An input image A can be filtered using a Sobel operator to calculate horizontal and vertical gradients of each pixel in the input image. The horizontal gradient can be expressed as $D_x=[-1\ 0\ 1]*A$, and the vertical gradient can be expressed as $D_y=[-1\ 0\ 1]^T*A$. Optionally, the horizontal and vertical gradients can be further processed using a Scharr filter to reduce or eliminate noise. The gradient amplitude and the gradient direction can then be calculated using horizontal and vertical gradients. The gradient amplitude can be expressed as $N=|D_x|+|D_y|$, and the gradient direction can be expressed as $$ND = \frac{D_y}{D_x}.$$

Once the gradient amplitude is calculated, it can be compared with a first threshold value to determine which edge pixels should be discarded as noise and which edge pixels should be retained. A pixel can be classified as an edge position when the gradient amplitude in that pixel is larger than or equals to a first threshold value, and a pixel can be classified as a non-edge position when the gradient amplitude in that pixel is less than a first threshold value. In one example, the gradient amplitude is calculated using a Sobel operator, and a first threshold value of 30 is used to filter the gradient amplitude.

Once the gradient direction is calculated, the edge direction can be determined as the direction normal to the gradient direction. The edge direction can be classified according to a predetermined, class and subclass classification rule. According to one exemplary rule, the edge direction can be classified into one of m angle subclasses and one of n angle classes. Each angle class comprises one or more subclasses, in and n are integers, and n≤m.

Referring to FIG. 1, the image interpolation method in the embodiment comprises a step 102, i.e., determining whether an interpolation point is located within an edge region. According to one exemplary method, whether an interpolation point is located within an edge region is determined based on the edge characteristics of an array of p×q pixels surrounding the interpolation point, p and q are integers larger than 1, p and q can be different or the same. Various array sizes can be utilized to determine whether an interpolation point is located within an edge region. For example, p and q can be 7 and 7, 5 and 5, 7 and 3, 5 and 3, or 5 and 7, respectively. An appropriate array size can be determined by experiment or simulation. In some embodiments, one or both of p and q are at least 4, 5, 6, 7, 8, or 9. In some embodiments, one or both of p and q are less than 20, 15, 10, 9, 8, 7, or 6.

Various methods can be utilized to determine whether an interpolation point is located within an edge region. In one exemplary method, an interpolation point is assigned to be within an edge region or a non-edge region by tallying the edge positions within an array of p×q pixels surrounding the interpolation point. The number of edge positions within the array corresponding to each angle subclass is calculated. If the number of edge positions corresponding to any one of the in angle subclasses is larger than or equals to a second threshold value, the interpolation position is determined, to be within an edge region. The interpolation position is determined to be within a non-edge region if none of the m angle subclasses contains a number of edge positions larger than or equaling to the second threshold value.

FIG. 2 is a flow chart illustrating an image interpolation method according to another embodiment. As discussed above, the edge direction can be classified into one of m angle subclasses and one of n angle classes. Each angle class includes one or more subclasses, m and n are integers, and n≤m. Referring to FIG. 2, the image interpolation method in the embodiment exemplifies an edge direction angle classification system wherein m=8 and n=3. In some embodiments, the eight angle subclasses can be defined according to the following subclass classification rule:

subclass 0, the range of edge direction angle is [0°, 11.25°+α]∪[168.75°, 191.25°+α]∪[348.75°, 360°];

subclass 1, the range of edge direction angle is [11.25°, 40°+α]∪[191.25°, 220°+α];

subclass 2, the range of edge direction angle is [40°, 50°+α]∪[220°, 230°+α];

subclass 3, the range of edge direction angle is [50°, 78.75+α]∪[230°, 258.75°+α];

subclass 4, the range of edge direction angle is [78.75°, 101.25°+α]∪[258.75°, 281.25°+α];

subclass 5, the range of edge direction angle is [101.25°, 130°+α]∪[281.25°, 310°+α];

subclass 6, the range of edge direction angle is [130°, 140°+α]∪[310°, 320°+α];

subclass 7, the range of edge direction angle is [140°, 168.75°+α]∪[320°, 348.75°+α];

In some embodiments, the eight angle subclasses can be defined according to the following subclass classification rule:

subclass 0, the range of edge direction angle is [0°, 11.25°]∪[168.75°−α, 191.25°]∪[348.75°−α, 360°];

subclass 1, the range of edge direction angle is [11.25°−α, 40°]∪[191.25°−α, 220°];

subclass 2, the range of edge direction angle is [40°−α, 50°]∪[220°−α, 230°];

subclass 3, the range of edge direction angle is [50°−α, 78.75]∪[230°−α, 258.75°];

subclass 4, the range of edge direction angle is [78.75°−α, 101.25°]∪[258.75°−α, 281.25°];

subclass 5, the range of edge direction angle is [101.25°−α, 130°]∪[281.25°−α, 310°];

subclass 6, the range of edge direction angle is [130°−α, 140°]∪[310°−α, 320°];

subclass 7, the range of edge direction angle is [140°−α, 168.75°]∪[320°−α, 348.75°];

The edge direction is measured in a counterclockwise direction from right horizontal direction. In the embodiment as shown in FIG. 2, α is an angle between 0° and 5°, and n=3. The first angle class includes the subclasses 0 and 4, the second angle class includes the subclasses 2 and 6, and the third angle class includes the subclasses 1, 3, 5, and 7.

Other suitable angle class and subclass classification rules can be adopted. For example, n can be any of 1-16 (e.g., 1, 2, 4, 8, 16) and m can be any of 1-32 (e.g., 1, 2, 4, 8, 16, 32), one angle class can comprises any of 1-16 angle subclasses (e.g., 1, 2, 4, 8, 16). Optionally, one or more angle classes of the n angle classes can contain only one angle subclass. Each angle class or subclass can overlap or do not overlap with other angle classes or subclasses. In general, the angle α can be defined by a suitable value depending on various factors such as the number of angle subclasses. The suitable angle α value can be determined by, e.g., experiment or simulation. For example, α can be a value of −5° to 5°, 0° to 5°, −5° to 0°, 0° to 10°, −10° to 0°, −10° to 10°, −15° to 15°, or −20° to 20°. Optionally, α is defined to be 0°, and none of the neighboring subclasses or classes overlap.

Once a suitable classification rule is adopted, and the edge positions within an array of p×q pixels surrounding the interpolation point are tallied, the number of edge positions in each of the angle subclass within the array can be calculated. Whether the interpolation position is located within an edge region can then be determined. Referring to FIG. 2, the method in the embodiment calculates the number of edge positions in each of the eight angle subclasses $C_0$, $C_1$, $C_2$, $C_3$, $C_4$, $C_5$, $C_6$, $C_7$, and compare them to a second threshold value. The interpolation position is determined to be located within an edge region if any of $C_0$-$C_7$ contains a number of edge positions larger than or equaling to a second threshold value. The interpolation position is determined to be located in a non-edge region if none of $C_0$-$C_7$ contains a number of edge positions larger than or equaling to the second threshold value. The second threshold value can be optimized depending, on various factors, e.g., the size of the pixel array surrounding the interpolation point. In the embodiment exemplified in FIG. 2, a second threshold value of 10 is used for a 5×5 pixel array. Optionally, the second threshold value can be 5, 10, 15, 20 in an array containing p×q pixels wherein p and q are any of 5-20.

Referring to FIG. 1, when the interpolation position is determined to be located in a non-edge region, the method in the embodiment performs interpolation using a preselected interpolation kernel, e.g., a step 106. The preselected interpolation kernel can be adaptive or non-adaptive interpolation kernels. Exemplary preselected interpolation kernels include two-dimensional interpolation kernels such as a Nearest interpolation kernel, a Bilinear interpolation kernel, a Bicubic interpolation kernel, a Lanczos interpolation kernel, and so on. Optionally, a two-dimensional interpolation kernel can be converted into two one-dimensional kernel, e.g., a horizontal interpolation kernel and a vertical interpolation kernel. Optionally, a Bicubic interpolation kernel is used to achieve a smooth non-edge region. Other interpolation kernels can be used.

Referring to FIG. 1, when the interpolation position is determined to be located in an edge region, the image interpolation method in the embodiment further includes a step 103, i.e., determining the edge direction of the interpolation point located within the edge region, and classifying the edge direction. Specifically, the step of classifying the edge direction includes selecting, an angle subclass having the maximum numbers of edge positions within the array of p×q pixels as a closest angle subclass, assigning the closest angle subclass to one of the n angle classes according to a predetermined angle class classification rule, and using the assigned angle class as the angle class for the edge direction.

For example, if only one of the m angle subclasses has a number of edge positions larger than the second threshold value, the only subclass is chosen as the closest angle subclass. If more than one of the m angle subclasses have a number of edge positions larger than the second threshold value, the subclass having the maximum numbers of edge positions would be chosen as the closest angle subclass. If more than one of the m angle subclasses have the maximum numbers of edge positions, any one of these angle subclasses having the maximum numbers of edge positions may be chosen as the closet angle subclass.

The closest angle subclass can be assigned to one of the n angle classes according to a predetermined angle class classification rule. Referring to FIG. 2, the predetermined angle class classification rule in the embodiment includes three angle classes and 8 angle subclasses. The first angle class includes the subclasses 0 and 4, the second angle class includes the subclasses 2 and 6, and the third angle class includes the subclasses 1, 3, 5, and 7. For example, if the closest angle subclass is subclass 2, it would be assigned to the first angle class. The first angle class is then used as the angle class for the edge direction.

Referring to FIG. 1, once the angle class for the edge direction is determined, the image interpolation method in the embodiment can further include a step 104, i.e., selecting a one-dimensional horizontal interpolation kernel based on the angle class assigned to the edge direction, and performing a horizontal interpolation using the selected one-dimensional horizontal interpolation kernel. Various one-dimensional horizontal interpolation kernels can be used. The one-dimensional horizontal interpolation kernels corresponding to different angle classes assigned to the edge direction can be different or the same. Optionally, a different one-dimensional horizontal interpolation kernel is selected and used for each different angle class. Alternatively, two or more or all assigned angle classes can use a same one-dimensional horizontal interpolation kernel.

Referring to FIG. 2, the method in the embodiment uses three different one-dimensional horizontal interpolation kernels corresponding to three different angle classes. For example, when the interpolation point has an edge direction in the first angle class, a one-dimensional Lanczos6 horizontal interpolation kernel is used to perform the horizontal interpolation. A one-dimensional Bicubic horizontal interpolation kernel is used when the interpolation point has an edge direction in the second angle class. A one-dimensional Lanczos3 horizontal interpolation kernel is used for the third angle class. In the embodiment illustrated in FIG. 2, if the closest angle subclass is 0 or 4, a one-dimensional Lanczos6 horizontal interpolation kernel is used to perform the horizontal interpolation. If the closest angle subclass is 2 or 6, a one-dimensional Bicubic horizontal interpolation kernel is used. If the closest angle subclasses 1, 3, 5, or 7, a one-dimensional Lanczos3 horizontal interpolation kernel is used. An optimal horizontal interpolation kernel corresponding to each angle subclass can be selected from a variety of horizontal interpolation kernels for smooth edge reduction and minimal image distortion, and can be determined by, e.g., experiment or simulation.

Referring to FIG. 1, the image interpolation method in the embodiment can further include a step 105, i.e., performing a vertical interpolation using a one-dimensional vertical interpolation kernel. The vertical interpolation can be performed sequentially or in parallel with the horizontal interpolation procedures. In the embodiment illustrated in FIG. 2, a one-dimensional Lanczos3 vertical interpolation kernel is utilized for vertical interpolation of the interpolation point. An optimal vertical interpolation kernel can be selected from a variety of vertical interpolation kernels for smooth edge reduction and minimal image distortion, and can be determined by, e.g., experiment or simulation.

Figure 4:
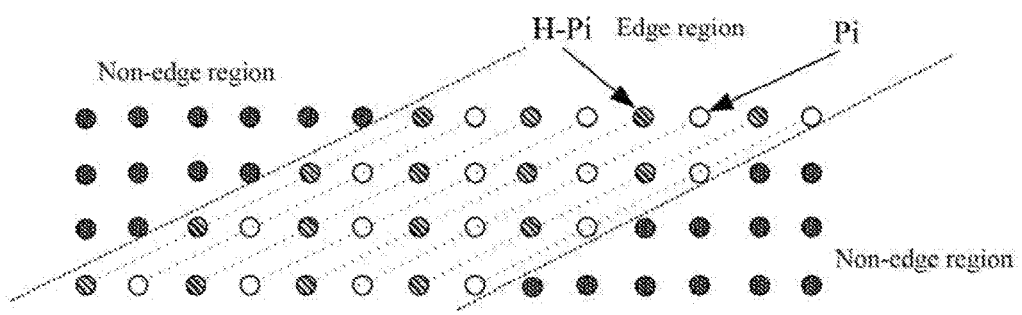
FIG. 4 is a diagram illustrating a horizontal interpolation process using a one-dimensional Bicubic horizontal interpolation kernel according to one embodiment.
Figure 5:
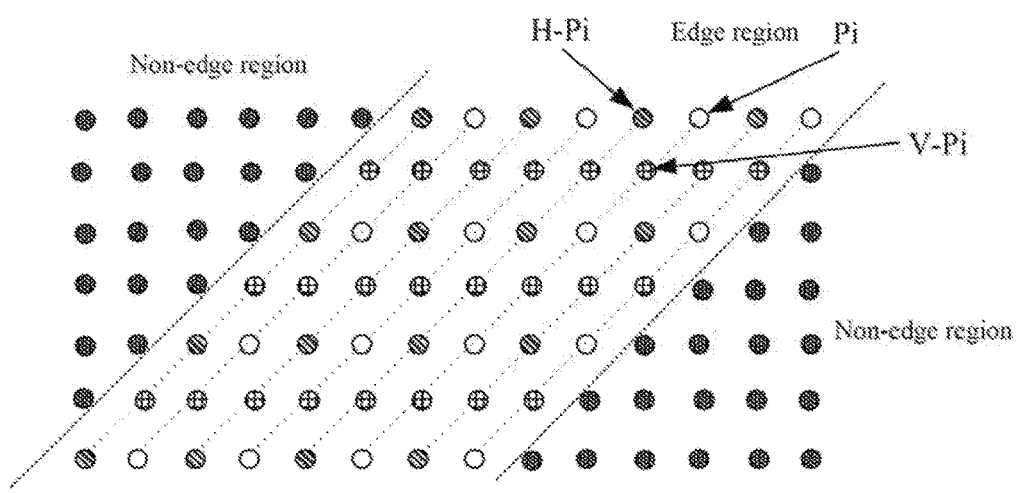
FIG. 5 is a diagram illustrating a vertical interpolation process using a one-dimensional Lanczos3 vertical interpolation kernel according to one embodiment.

Referring to FIGS. 3-5, the method in the embodiment illustrates a process of enlarging an original image by increasing the resolution from W×H to 2 W×2 H. The enlargement process generates, on average, three interpolation points around an original pixel. To perform horizontal and vertical interpolation, a zero padding operation is conducted to obtain an upsampled image, followed by low pass filtering the upsampled image data with a one-dimensional horizontal interpolation kernel and as one-dimensional vertical interpolation kernel. Because a low pass filter is ineffective on the "zero" positions in the upsampled image, parity separation of the interpolation kernel is required.

For example, in the process of horizontal interpolation using a one-dimensional Lanczos3 horizontal interpolation kernel, the one-dimensional Lanczos3 horizontal interpolation kernel can be separated into a leftward horizontal interpolation kernel $Lanczos3_L$ and a rightward horizontal interpolation kernel $Lanczos3_R$, wherein $$Lanczos3_L=[1\ -9\ 35\ 114\ -17\ 4]/128$$

$$Lanczos3_R=[4\ -17\ 114\ 35\ -9\ 1]/128$$

The output of the leftward horizontal interpolation kernel $Lanczos3_L$ and the rightward horizontal interpolation kernel $Lanczos3_R$ can be expressed as:

$$Output_L=Lanczos3_L*Input$$

$$Output_R=Lanczos3_R*Input$$

When using a one-dimensional Lanczos6 horizontal interpolation kernel, the one-dimensional Lanczos6 horizontal interpolation kernel can be separated into a leftward horizontal interpolation kernel $Lanczos6_L$ and a rightward horizontal interpolation kernel $Lanczos6_R$, wherein $$Lanczos6_L=[-1\ 6\ -14\ 29\ -57\ 150\ 459\ -86\ 40\ -21\ 10\ -3]/128$$

$$Lanczos6_R=[-3\ 10\ -21\ 40\ -86\ 459\ 150\ -57\ 29\ -14\ 6\ -1]/128$$

The output of the leftward horizontal interpolation kernel $Lanczos6_L$ and the rightward horizontal interpolation kernel $Lanczos6_R$ can be expressed as:

$$Output_L=Lanczos6_L*Input$$

$$Output_R=Lanczos6^R*Input$$

Similarly, when using a one-dimensional Bicubic horizontal interpolation kernel, the one-dimensional Bicubic horizontal interpolation kernel can be separated into a leftward horizontal interpolation kernel $Bicubic_L$ and a rightward horizontal interpolation kernel $Bicubic_R$, wherein $$Bicubic_L=[-1\ 6\ -14\ 29\ -57\ 150\ 459\ -86\ 40\ -21\ 10\ -3]/128$$

$$Bicubic_R[-3\ 10\ -21\ 40\ -86\ 459\ 150\ -57\ 29\ -14\ 6\ -1]/128$$

The output of the leftward horizontal interpolation kernel $Lanczos6_L$ and the rightward horizontal interpolation kernel $Lanczos6_R$ can be expressed as:

$$Output_L=Bicubic_L*Input$$

$$Output_R=Bicubic_R*Input$$

Similarly, in the process of vertical interpolation, for example, using, as one-dimensional Lanczos3 vertical interpolation kernel, the interpolation kernel can be separated into an upward vertical interpolation kernel $Lanczos3_U$ and as downward vertical interpolation kernel $Lanczos3_D$, wherein $$Lanczos3_U=(Lanczos3_L)^T$$

$$Lanczos3_D=(Lanczos3_R)^T$$

The output of the upward vertical interpolation kernel $Lanczos3_U$ and the downward vertical interpolation kernel $Lanczos3_D$ can be expressed as:

$$Output_{UL}=Lanczos3_U*Output_L$$

$$Output_{UR}=Lanczos3_U*Output_R$$

$$Output_{DL}=Lanczos3_D*Output_L$$

$$Output_{DR}=Lanczos3_D*Output_R$$

wherein one of the $Output_{UL}$, $Output_{UR}$, $Output_{DL}$, and $Output_{DR}$ can be assigned to the original pixel, and the other three assigned to three interpolation positions.

Based on the above, the output image after the horizontal and vertical interpolation operations can be expressed as $$Output = \begin{bmatrix} Output_{UL}(0,0) & Output_{UR}(0,0) & \ldots \\ Output_{DL}(0,0) & Output_{DR}(0,0) & \ldots \\ \vdots & \vdots & \ddots \end{bmatrix}$$

FIGS. 3-5 illustrate an exemplary embodiment of the image interpolation method. FIG. 3 is a diagram showing an unprocessed oriental image. FIG. 4 is a diagram illustrating a horizontal interpolation using a one-dimensional Bicubic horizontal interpolation kernel. FIG. 5 is a diagram illustrating a vertical interpolation using a one-dimensional Lanczos3 vertical interpolation kernel. The resolution of the original image is W×H. When the resolution is increased from W×H to 2 W×H, interpolation positions H-Pi are inserted along the horizontal direction. Next, when the resolution is further increased from W×2 H to 2 W×2 W×2 H interpolation positions V-Pi are inserted along the vertical direction. Horizontal interpolation can be performed using, e.g., a one-dimensional Bicubic horizontal interpolation kernel. Vertical interpolation can be performed using, e.g., a one-dimensional Lanczos3 vertical interpolation kernel. For example, if the closest angle subclass is angle subclass 2, i.e. [40°, 50°+α]∪[220°, 230°+α], then the second angle class is chosen as the angle class for the edge direction. Horizontal interpolation can be performed using leftward horizontal interpolation kernel $Bicubic_L$ and rightward horizontal interpolation kernel $Bicubic_R$. Vertical interpolation can be performed using Lanczos3 vertical interpolation kernel.

Figure 6:
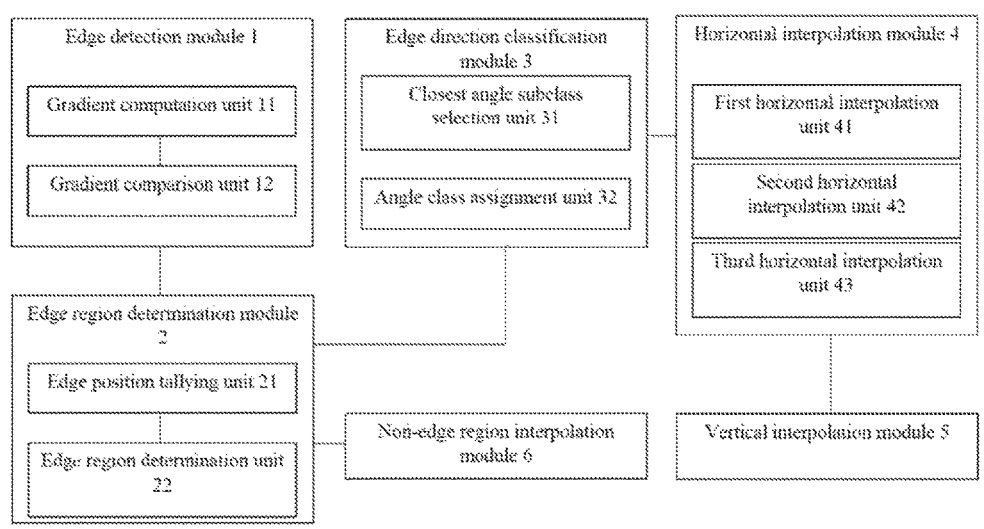
FIG. 6 is a diagram showing an image interpolation device according to one embodiment.

FIG. 6 is a diagram showing, an image interpolation device according to one embodiment. Referring to FIG. 6, the device in the embodiment includes an edge detection module 1, an edge region determination module 2, an edge direction classification module 3, a horizontal interpolation module 4, a vertical interpolation module 5, and a non-edge region interpolation module 6. The edge detection module 1 detects an edge position in an image and obtaining edge characteristics associated with the edge position. The edge region determination module 2 determines whether an interpolation point is located within an edge region based on the edge characteristics of an array of p×q pixels surrounding the interpolation point (p and q are integers larger than 1). The edge direction classification module 3 determines edge direction of an interpolation point located within the edge region, and classifies the edge direction into one of m angle subclasses and one of n angle classes (m and n are integers, and as n≤m). Each angle class may include one or more subclasses. The horizontal interpolation module 4 selects a one-dimensional horizontal interpolation kernel based on the classified angle class, and performs a horizontal interpolation on the interpolation point using the selected one-dimensional horizontal interpolation kernel. The vertical interpolation module 5 performs a vertical interpolation on the interpolation point using as one-dimensional vertical interpolation kernel. The non-edge region interpolation module 6 performs interpolation on an interpolation point using a preselected interpolation kernel if the interpolation position is determined to be located within a non-edge region. The tasks performed by modules 1-6 generally correspond to the steps 101-106 in FIG. 1.

Referring to FIG. 6, the edge detection module 1 in the embodiment include a gradient computation unit 11 and a gradient comparison unit 12. The gradient computation unit 11 computes gradient amplitude and gradient direction in each pixel. The gradient comparison unit 12 compares the gradient in each pixel with a first threshold value. A pixel is classified as an edge position when the gradient amplitude in the pixel is larger than or equals to a first threshold value.

The edge region determination module 2 in the embodiment includes an edge position tallying unit 21 and an edge region determination unit 22. The edge position tallying unit 21 tallies edge positions within an array of p×q pixels surrounding the interpolation point, and calculates the number of edge positions in each of the angle subclass within the array. The edge region determination unit 22 determines whether the interpolation position is located in an edge region. An interpolation position is determined to be located within an edge region if the number of edge positions within any one of the in angle subclasses is larger than or equals to a second threshold value. An interpolation position is determined to be located in a non-edge region if none of the m angle subclasses contains a number of edge positions larger than or equaling to the second threshold value. The second threshold value can be optimized depending on various factors, e.g., the size of the pixel array surrounding the interpolation point. In some embodiments, the second threshold value can be 5, 10, 15, 20 in an array containing p×q pixels wherein p and q are any of 5-20. Optionally, a second threshold value of 10 is used for a 5×5 pixel array.

The edge direction classification module 3 in the embodiment further includes a closest angle subclass selection unit 31 and an angle class assignment unit 32. The closest angle subclass selection unit 31 selects an angle subclass having the maximum numbers of edge positions within the array of p×q pixels as a closest angle subclass. The angle class assignment unit 32 assigns the closest angle subclass to one of the n angle classes according to a predetermined angle class classification rule, and uses the assigned angle class as the angle class for the edge direction.

Optionally, m=8 and n=3. Optionally, the eight angle subclasses can be defined according to the following rule:

subclass 0, the range of edge direction angle is [0°, 11.25°+α]∪[168.75°, 191.25°+α]∪[348.75°, 360°];

subclass 1, the range of edge direction angle is [11.25°, 40°+α]∪[191.25°, 220°+α];

subclass 2, the range of edge direction angle is [40°, 50°+α]∪[220°, 230°+α];

subclass 3, the range of edge direction angle is [50°, 78.75+α]∪[230°, 258.75°+α];

subclass 4, the range of edge direction angle is [78.75°, 101.25°+α]∪[258.75°, 281.25°+α];

subclass 5, the range of edge direction angle is [101.25°, 130°+α]∪[281.25°, 310°+α];

subclass 6, the range of edge direction angle is [130°, 140°+α]∪[310°, 320°+α];

subclass 7, the range of edge direction angle is [140°, 168.75°+α]∪[320°, 348.75°+α];

Optionally, the eight angle subclasses can be defined according to the following rule:

subclass 0, the range of edge direction angle is [0°, 11.25°]∪[168.75°−α, 191.25°]∪[348.75°−α, 360°];

subclass 1, the range of edge direction angle is [11.25°−α, 40°]∪[191.25°−α, 220°];

subclass 2, the range of edge direction angle is [40°−α, 50°]∪[220°−α, 230°];

subclass 3, the range of edge direction angle is [50°−α, 78.75]∪[230°−α, 258.75°];

subclass 4, the range of edge direction angle is [78.75°−α, 101.25°]∪[258.75°−α, 281.25°];

subclass 5, the range of edge direction angle is [101.25°−α, 130°]∪[281.25°−α, 310°];

subclass 6, the range of edge direction angle is [130°−α, 140°]∪[310°−α, 320°];

subclass 7, the range of edge direction angle is [140°−α, 168.75°]∪[320°−α, 348.75°];

The edge direction is measured in a counterclockwise direction from right horizontal direction. In some embodiments, α is an angle between 0° and 5°, and n=3. The first angle class comprises the subclasses 0 and 4, the second angle class comprises the subclasses 2 and 6, and the third angle class comprises the subclasses 1, 3, 5, and 7.

Other suitable angle class and subclass classification rules can be adopted. For example, n can be any of 1-16 (e.g., 1, 2, 4, 8, 16) and m can be any of 1-32 (e.g., 1, 2, 4, 8, 16, 32), one angle class can comprises any of 1-16 angle subclasses (e.g., 1, 2, 4, 8, 16). Optionally, one or more angle classes of the a angle classes can contain only one angle subclass. Each angle class or subclass can overlap or do not overlap with other angle classes or subclasses. In general, the angle α can be defined by a suitable value depending on various factors such as the number of angle subclasses. The suitable angle α value can be determined by, e.g., experiment or simulation. For example, α can be a value of −5° to 5°, 0° to 5°, −5° to 0°, 0° to 10°, −10° to 0°, −10° to 10°, −15° to 15°, or −20° to 20°. Optionally, α is defined to be 0°, and none of the neighboring subclasses or classes overlap.

The horizontal interpolation module 4 in the embodiment includes a first horizontal interpolation unit 41, a second horizontal interpolation unit 42, and as third horizontal interpolation unit 43, each of which corresponds to a different angle class. The horizontal interpolation module 4 may have as different number of horizontal interpolation units depending on the total numbers of the angle classes. In some embodiments, the number of horizontal interpolation units corresponds to the total number of the angle classes, n. Optionally, the horizontal interpolation module 4 may have any of 1-32 (e.g., 1, 2, 4, 8, 16, 32) horizontal interpolation units. Optionally, one horizontal interpolation unit corresponds to two or more angle classes.

In some embodiments, the horizontal interpolation units perform adaptive horizontal interpolation to enhance the image quality. Optionally, the first horizontal interpolation unit 41 performs a horizontal interpolation using a one-dimensional. Lanczos6 horizontal interpolation kernel on an interpolation point having the edge direction in the first angle class. Optionally, the second horizontal interpolation unit 42 performs a horizontal interpolation using a one-dimensional Bicubic horizontal interpolation kernel on an interpolation point having the edge direction in the second angle class. Optionally, the third horizontal interpolation unit 43 performs a horizontal interpolation using a one-dimensional Lanczos3 horizontal interpolation kernel on an interpolation point having the edge direction in the third angle class.

The vertical interpolation module 5 in the embodiment uses a one-dimensional Lanczos3 vertical interpolation kernel for performing a vertical interpolation on the interpolation point. The vertical interpolation can be performed sequentially or in parallel with the horizontal interpolation procedures. In the embodiment as shown in FIG. 2, a one-dimensional Lanczos3 vertical interpolation kernel is used for vertical interpolation of the interpolation point. An optimal vertical interpolation kernel can be selected from a variety of vertical interpolation kernels for smooth edge reduction and minimal image distortion, and can be determined by, e.g., experiment or simulation.

Embodiments of the present disclosure can include systems for implementing the described methods, as well as computer-readable storage medium coded with instructions for causing a computer to execute the described methods. For example, an electronic system including a processor, a memory and an electronic communication device may be configured to interpolate a pixel and enhancing an edge in an image. The system may represent a user computer system, wireless communication devices, subnetworks, a server, or any other network-capable device with the requisite functional capabilities.

The system and servers may include any number of processors that are coupled to storage devices including a first storage (typically a random access memory, or "RAM"), second storage (typically a read only memory, or "ROM"). Both of these storage devices may include any suitable type of the computer-readable media described and/or mentioned above. A mass storage device may also be used to store programs, data and the like and is typically a secondary storage medium, such as a hard disk that is slower than primary storage. It will be appreciated that the information retained within the mass storage device, may, in appropriate eases, be incorporated in standard manner as part of primary storage as virtual memory. A specific mass storage device such as a CD-ROM may also pass data uni-directionally to the processor.

A computer system may also include an interface that includes one or more input/output devices such as video monitors, track balls, mice, keyboards, microphones, touch-sensitive displays, transducer card readers, magnetic or paper tape readers, tablets, styluses, voice or handwriting recognizers, or other known input devices, including other appropriately linked computers. The system may be coupled to a computer or other electronic communication network using a network connection. The network can connect various wired, optical, electronic and other known networks to exchange information among computers, servers, wireless communication devices, and sub-networks. With such a network connection, it is contemplated that the system and the processor(s) therein may receive information from the network, or may output information to the network in the course of performing the above-described method steps. The hardware elements described above may be configured to act as one or more units for performing the operations described above.

In addition, embodiments of the present disclosure further include computer-readable storage media that include program instructions for performing various computer-implemented operations of the described methods. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element or component in the present disclosure is intended to be dedicated to the public regardless of whether the element or component is explicitly recited in the following claims.

What is claimed is:

1. An image interpolation method for interpolating a pixel, comprising:
   detecting an edge position in an image and obtaining edge characteristics associated with the edge position;
   determining whether an interpolation point is located within an edge region based on the edge characteristics of an array of p×q pixels surrounding the interpolation point, wherein p and q are integers larger than 1;
   determining edge direction of an interpolation point located within the edge region;
   classifying the edge direction into one of m angle subclasses and one of n angle classes; wherein each angle class comprises one or more subclasses, m and n are integers, and n≤m;
   selecting a one-dimensional horizontal interpolation kernel for the interpolation point located within the edge region based on an angle class classified for the edge direction of the interpolation point located within the edge region;
   performing a horizontal interpolation on the interpolation point located within the edge region using the one-dimensional horizontal interpolation kernel selected for the interpolation point located within the edge region; and
   performing a vertical interpolation on the interpolation point located within the edge region using a one-dimensional vertical interpolation kernel;
   wherein a same one-dimensional vertical interpolation kernel is used for performing the vertical interpolation for interpolation points located within the edge region having edge directions respectively classified in at least two different classes of the n angle classes:
   a first one-dimensional horizontal interpolation kernel is selected for a first interpolation point located within the edge region having a first edge direction classified into a first angle class of the n angle classes;
   a second one-dimensional horizontal interpolation kernel is selected for a second interpolation point located within the edge region having a second edge direction classified into a second angle class of the n angle classes, the second angle class being different from the first angle class;
   performing the horizontal interpolation comprises performing the horizontal interpolation on the first interpolation point using the first one-dimensional horizontal interpolation kernel and performing the horizontal interpolation on the second interpolation point using the second one-dimensional horizontal interpolation kernel; and
   the first one-dimensional horizontal interpolation kernel and the second one-dimensional horizontal interpolation kernel are different interpolation kernels.

2. The method of claim 1, further comprising:
   performing the horizontal interpolation using a one-dimensional Lanczos6 horizontal interpolation kernel on the interpolation point having the edge direction in a first angle class of then angle classes;
   performing the horizontal interpolation using a one-dimensional Bicubic horizontal interpolation kernel on the interpolation point having the edge direction in a second angle class of the n angle classes; and
   performing the horizontal interpolation using a one-dimensional Lanczos3 horizontal interpolation kernel on the interpolation point having the edge direction in a third angle class of the n angle classes.

3. The method of claim 1, wherein detecting the edge position in the image and obtaining the edge characteristics associated with the edge position comprises:
   computing a gradient amplitude and a gradient direction in each pixel; and
   comparing the gradient amplitude in each pixel with a first threshold value;
   wherein the pixel is classified as the edge position when the gradient amplitude in the pixel is larger than or equals to the first threshold value.

4. The method of claim 1, wherein determining whether the interpolation point is within the edge region comprises:
   tallying edge positions within an array of p×q pixels surrounding the interpolation point;
   calculating a number of edge positions in each of the m angle subclasses within the array of p×q pixels; and
   determining whether the interpolation point is located within the edge region;
   wherein the interpolation point is determined to be located within the edge region if the number of edge positions within any one of the m angle subclasses is larger than or equals to a second threshold value, otherwise the interpolation point is determined to be located in a non-edge region.

5. The method of claim 1, wherein classifying the edge direction comprises:
   selecting angle subclass having maximum numbers of edge positions within the array of p×q pixels as a closest angle subclass;
   assigning the closest angle subclass to one of the n angle classes as an assigned angle class according to a predetermined angle class classification rule; and
   using the assigned angle class as the angle class for the edge direction.

6. The method of claim 1, wherein performing the vertical interpolation on the interpolation point comprises using a one-dimensional Lanczos3 vertical interpolation kernel for performing the vertical interpolation on the interpolation point.

7. The method of claim 1, further comprising performing interpolation on the interpolation point using a preselected interpolation kernel if the interpolation point is determined to be located in a non-edge region.

8. The method of claim 1, wherein p=q, n=3, the n angle classes comprise a first angle class, a second angle class, and a third angle class, the method further comprising:
   performing the horizontal interpolation using a one-dimensional Lanczos6 horizontal interpolation kernel on the interpolation point having the edge direction in the first angle class;
   performing the horizontal interpolation using a one-dimensional Bicubic horizontal interpolation kernel on the interpolation point having the edge direction in the second angle class; and
   performing the horizontal interpolation using a one-dimensional Lanczos3 horizontal interpolation kernel on the interpolation point having the edge direction in the third angle class.

9. The method of claim 8, wherein m=8, and the edge direction is classified according to one of following two predetermined subclass classification rules:
   subclass 0: $[0°, 11.25°+\alpha] \cup [168.75°, 191.25°+\alpha] \cup [348.75°, 360°]$;
   subclass 1: $[11.25°, 40°+\alpha] \cup [191.25°, 220°+\alpha]$;
   subclass 2: $[40°, 50°+\alpha] \cup [220°, 230°+\alpha]$;
   subclass 3: $[50°, 78.75°+\alpha] \cup [230°, 258.75°+\alpha]$;
   subclass 4: $[78.75°, 101.25°+\alpha] \cup [258.75°, 281.25°+\alpha]$;

subclass 5: [101.25°, 130°+α]∪[281.25°, 310°+α];
subclass 6: [130°, 140°+α]∪[310°, 320°+α];
subclass 7: [140°, 168.75°+α]∪[320°, 348.75°+α]; or
subclass 0: [0°, 11.25°]∪[168.75°−α, 191.25°]∪[348.75°−α, 360°];
subclass 1: [11.25°−α, 40°]∪[191.25°−α, 220°];
subclass 2: [40°−α, 50°]∪[220°−α, 230°];
subclass 3: [50°−α, 78.75°]∪[230°−α, 258.75°];
subclass 4: [78.75°−α, 101.25°]∪[258.75°−α, 281.25°];
subclass 5: [101.25°−α, 130°]∪[281.25°−α, 310°];
subclass 6: [130°−α, 140°]∪[310°−α, 320°];
subclass 7: [140°−α, 168.75°]∪[320°−α, 348.75°];
wherein α is between 0° and 5°, the first angle class comprises the subclasses 0 and 4, the second angle class comprises the subclasses 2 and 6, the third angle class comprises the subclasses 1, 3, 5, and 7, and the edge direction is measured in a counterclockwise direction from right horizontal direction.

10. The method of claim 4, wherein the second threshold value is 10.

11. The method of claim 1, wherein the same one-dimensional vertical interpolation kernel is used for performing the vertical interpolation for any interpolation point located within the edge region having the edge direction classified in all of the n angle classes.

12. An image interpolation device for interpolating a pixel and enhancing an edge in an image, comprising:
a memory; and
one or more processors;
wherein the memory and the one or more processors are connected with each other;
the memory stores computer-executable instructions for controlling the one or more processors to:
detect an edge position in an image and obtain edge characteristics associated with the edge position;
determine whether an interpolation point is located within an edge region based on the edge characteristics of an array of p×q pixels surrounding the interpolation point, wherein p and q are integers larger than 1;
determine edge direction of an interpolation point located within the edge region; and classify the edge direction into one of m angle subclasses and one of n angle classes; wherein each angle class comprises one or more subclasses, m and n are integers, and n≤m;
select a one-dimensional horizontal interpolation kernel based on an angle class classified for the edge direction of the interpolation point located within the edge region;
perform a horizontal interpolation on the interpolation point located within the edge region using the one-dimensional horizontal interpolation kernel selected for the interpolation point located within the edge region; and
perform a vertical interpolation on the interpolation point located within the edge region using a one-dimensional vertical interpolation kernel;
wherein a same one-dimensional vertical interpolation kernel is used for performing the vertical interpolation for interpolation points located within the edge region having edge directions respectively classified in at least two different classes of the n angle classes;
a first one-dimensional horizontal interpolation kernel is selected for a first interpolation point located within the edge region having a first edge direction classified into a first angle class of the n angle classes;
a second one-dimensional horizontal interpolation kernel is selected for a second interpolation point located within the edge region having a second edge direction classified into a second angle class of the n angle classes, the second angle class being different from the first angle class;
the memory stores computer-executable instructions for controlling the one or more processors to perform the horizontal interpolation by performing the horizontal interpolation on the first interpolation point using the first one-dimensional horizontal interpolation kernel and performing the horizontal interpolation on the second interpolation point using the second one-dimensional horizontal interpolation kernel; and
the first one-dimensional horizontal interpolation kernel and the second one-dimensional horizontal interpolation kernel are different interpolation kernels.

13. The image interpolation device of claim 12, wherein the same one-dimensional vertical interpolation kernel is used for performing the vertical interpolation for any interpolation point located within the edge region having the edge direction classified in all of the n angle classes.

14. The image interpolation device of claim 12, wherein the memory stores computer-executable instructions for controlling the one or more processors to perform the horizontal interpolation by:
performing the horizontal interpolation using a one-dimensional Lanczos6 horizontal interpolation kernel on the interpolation point having the edge direction in a first angle class of then angle classes;
performing the horizontal interpolation using a one-dimensional Bicubic horizontal interpolation kernel on the interpolation point having the edge direction in a second angle class of the n angle classes; and
performing the horizontal interpolation using a one-dimensional Lanczos3 horizontal interpolation kernel on the interpolation point having the edge direction in a third angle class of the n angle classes.

15. The image interpolation device of claim 12, wherein the memory stores computer-executable instructions for controlling the one or more processors to detect the edge position in the image and obtain the edge characteristics associated with the edge position by computing a gradient amplitude and a gradient direction in each pixel, and comparing the gradient amplitude in each pixel with a first threshold value; wherein the pixel is classified as the edge position when the gradient amplitude in the pixel is larger than or equals to the first threshold value.

16. The image interpolation device of claim 12, wherein the memory stores computer-executable instructions for controlling the one or more processors to determine whether the interpolation point is located within the edge region by:
tallying edge positions within an array of p×q pixels surrounding the interpolation point, and calculating a number of edge positions in each of the m angle subclasses within the array of p×q pixels, and
determining whether the interpolation point is located in the edge region;
wherein the interpolation point is determined to be located within the edge region if the number of edge positions within any one of the m angle subclasses is larger than or equals to a second threshold value, otherwise the interpolation point is determined to be located in a non-edge region.

17. The image interpolation device of claim 12, wherein the memory stores computer-executable instructions for controlling the one or more processors to determine the edge direction of the interpolation point located within the edge region and classify the edge direction by:

selecting angle subclass having maximum numbers of edge positions within the array of p×q pixels as a closest angle subclass; and assigning the closest angle subclass to one of the n angle classes as an assigned angle class according to a predetermined angle class classification rule, and using the assigned angle class as the angle class for the edge direction.

18. The image interpolation device of claim 12, wherein p=q, n=3, the n angle classes comprise a first angle class, a second angle class, and a third angle class, and the memory stores computer-executable instructions for controlling the one or more processors to perform the horizontal interpolation by:

performing the horizontal interpolation using a one-dimensional Lanczos6 horizontal interpolation kernel on the interpolation point having the edge direction in the first angle class;

performing the horizontal interpolation using a one-dimensional Bicubic horizontal interpolation kernel on the interpolation point having the edge direction in the second angle class; and performing the horizontal interpolation using a one-dimensional Lanczos3 horizontal interpolation kernel on the interpolation point having the edge direction in the third angle class.

19. The image interpolation device of claim 18, wherein m=8, and the memory stores computer-executable instructions for controlling the one or more processors to classify the edge direction according to one of following two predetermined subclass classification rules:

subclass 0: [0°, 11.25°+α]∪[168.75°, 191.25°+α]∪[348.75°, 360°];
subclass 1: [11.25°, 40°+α]∪[191.25°, 220°+α];
subclass 2: [40°, 50°+α]∪[220°, 230°+α];
subclass 3: [50°, 78.75°+α]∪[230°, 258.75°+α];
subclass 4: [78.75°, 101.25°+α]∪[258.75°, 281.25°+α];
subclass 5: [101.25°, 130°+α]∪[281.25°, 310°+α];
subclass 6: [130°, 140°+α]∪[310°, 320°+α];
subclass 7: [140°, 168.75°+α]∪[320°, 348.75°+α]; or
subclass 0: [0°, 11.25°]∪[168.75°−α, 191.25°]∪[348.75°−α, 360°];
subclass 1: [11.25°−α, 40°]∪[191.25°−α, 220°];
subclass 2: [40°−α, 50°]∪[220°−α, 230°];
subclass 3: [50°−α, 78.75°]∪[230°−α, 258.75°];
subclass 4: [78.75°−α, 101.25°]∪[258.75°−α, 281.25°];
subclass 5: [101.25°−α, 130°]∪[281.25°−α, 310°];
subclass 6: [130°−α, 140°]∪[310°−α, 320°];
subclass 7: [140°−α, 168.75°]∪[320°−α, 348.75°];
wherein α is between 0° and 5°, the first angle class comprises the subclasses 0 and 4, the second angle class comprises the subclasses 2 and 6, the third angle class comprises the subclasses 1, 3, 5, and 7, and the edge direction is measured in a counterclockwise direction from right horizontal direction.

20. The image interpolation device of claim 16, wherein the second threshold value is 10.

* * * * *